United States Patent [19]

Beckert et al.

[11] 4,022,705

[45] May 10, 1977

[54] GAS GENERATING COMPOSITIONS

[75] Inventors: Werner F. Beckert, Las Vegas, Nev.; William H. Barber, Brandywine, Md.; Ottmar H. Dengel, Front Royal, Va.

[73] Assignee: The United States of America as represented by the Secretary of the Navy, Washington, D.C.

[22] Filed: Mar. 27, 1975

[21] Appl. No.: 562,716

[52] U.S. Cl. .................. 252/188.3 R; 260/676 R; 423/648 R
[51] Int. Cl.² .......................................... C09K 3/00
[58] Field of Search ............... 252/188, 188.3 R; 423/646–648

[56] References Cited

UNITED STATES PATENTS

| | | | |
|---|---|---|---|
| 3,450,638 | 6/1969 | Edwards | 252/188 |
| 3,734,863 | 5/1973 | Beckert et al. | 252/188 |

Primary Examiner—Leland A. Sebastian
Attorney, Agent, or Firm—R. S. Sciascia; A. L. Branning; H. B. Field

[57] ABSTRACT

Solid compositions which are stable at ambient temperatures and which, when heated to initiate the reaction between the components of the compositions generate pure or mixed gaseous hydrocarbons which may be isotopically labeled, or pure or mixed hydrogen isotopes, or combinations of the above.

The compositions comprise certain ammonium salts such as $N(CH_3)_4Cl$ or $NH_4Cl$, and complex hydrides such as $LiAlH_4$ or $NaAlH_4$, or certain hydrazine derivatives such as $N_2(CH_3)_6Cl_2$ or $N_2H_6Cl_2$ and complex hydrides such as $NaBH_4$, wherein all components H and C stand for the various isotopes of these elements.

24 Claims, No Drawings

GAS GENERATING COMPOSITIONS

BACKGROUND OF THE INVENTION

This invention relates generally to the art of gas generation and more specifically to compositions and methods for generating gaseous hydrocarbons or mixtures thereof, for generating isotopically labeled hydrocarbons or mixtures thereof, for generating pure hydrogen isotopes or mixtures thereof, and for generating mixtures of the above gases.

There are currently only a limited number of methods available to rapidly generate hydrogen on a relatively small scale, especially when severe weight and volume restrictions are imposed on the overall system. U.S. Pat. No. 3,734,863 to Beckert et al which is incorporated herein by reference describes compositions which reliably generate hydrogen gas. This method is based on a solid state reaction between two or more suitable components which is initiated by locally heating a mixture of the components. Packing these hydrogen generating compositions in suitable gas generators makes them a convenient source of predetermined quantities of hydrogen gas.

The special problems inherent in hydrogen gas generation and solved by the referenced patented method persist in the attempt to rapidly generate, on demand, specific gaseous hydrocarbons which may or may not be isotopically labeled, or hydrogen isotopes and isotopes mixtures, or combinations of these gases. Present methods of supplying hydrogen isotopes or labeled or unlabeled hydrocarbons include storing the gases in high pressure cylinders. Reactions between suitably labeled reactants are also used to generate hydrogen isotopes. Examples of the reaction include but are not limited to the reactions of metals or metal hydrides with acids, bases, water or alcohols. These methods require substantial effort to initiate gas generation, the generation rates are generally rather slow, and the gas generating systems are bulky and heavy. Furthermore, additives and modifiers are not easily incorporated into the systems thereby complicating gas generation adjustment both as to temperature and as to rate. These methods are, therefore, not suitable for many applications. It is desirable that compositions for producing the hydrocarbons or hydrogen isotopes, as outlined above, have low ratios of weight of reactants to volumes of gas generated, and that the compositions, when reactions are initiated, produce the gases in a relatively short time. It is suitable if the composition reacts to produce a solid component and the desired gas or gas mixture. In this manner, the gas can be simply filtered to retain the undesirable solid product. Such compositions and methods, if achieved, are particularly attractive for use in chemical laser systems and fuel cells as well as in certain types of nuclear reactions, especially when operated in remote areas where complicated generating and mixing systems are not practical, or when weight and/or volume restrictions are imposed as in rockets, aircraft, ships, submarines and space applications.

SUMMARY OF THE INVENTION

Therefore, it is an object of this invention to provide a composition and method for generating gaseous hydrocarbons or mixtures of gaseous hydrocarbons.

Another object of this invention is to provide a composition and method for generating gaseous hydrocarbons which contain certain percentages of hydrogen isotopes and/or carbon isotopes.

Yet another object of this invention is to provide a composition and method for generating gaseous hydrogen isotopes or mixtures thereof.

A further object of this invention is to provide a composition and method for generating mixtures of pure hydrocarbons with pure or mixed hydrogen isotopes.

A still further object of this invention is to provide a composition and method for generating combinations of mixtures of gaseous hydrocarbons which in themselves can be isotopically labeled with pure or mixed hydrogen isotopes.

Also an object of this invention is to provide a storable composition for generating said gases and gaseous mixtures which are particularly applicable where relatively small amounts of the gases are required in a short time.

A further object of the invention is to provide methods for generating said gases and gaseous mixtures in which the ratio of weight of reactants to volume of gas generated is smaller than heretofore attained.

A still further object of this invention is to provide a method for generating said gases which is economical and relatively safe.

Another object of this invention is to provide a gas suitable for laser applications.

Yet another object of this invention is to provide a gas suitable for use in a fuel cell.

A further object of this invention is to provide a gas suitable for use in nuclear reactions.

Also an object of this invention is to provide a method for generating gas in restricted and weight-and volume-limited situations.

These and other objects are accomplished by providing solid compositions comprising certain ammonium salts and complex hydrides or certain hydrazine derivatives and complex hydrides which generate said gases or gaseous mixtures upon heating to initiate the reaction between the components.

DESCRIPTION OF THE PREFERRED EMBODIMENTS

The method of this invention is based on a solid state reaction between two or more suitable components. Particularly, the component ingredients employed in the mixtures and methods of the present invention and the reactions by which the desired gas is generated are expressed by the following general formulas and general equations:

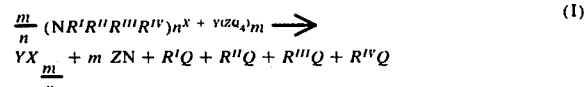

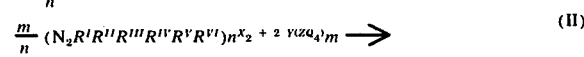

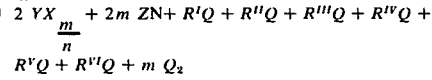

where:
N = Nitrogen;
$R^I$–$R^{VI}$ = Similar or dissimilar hydrocarbon radicals of up to ten carbon atoms (which may contain a certain percentage of hydrogen isotopes and/or carbon isotopes), or similar or dissimilar hydrogen isotopes;

X = An inorganic or organic acid radical such as halogen, sulfate, and the like;

n = Valency of said acid group;

Y = Mono- or divalent metal capable of forming complex hydrides such as alkali and alkaline earth metals (e.g. Li, Na, K, Mg, Ba, Ca, etc.);

m = Valency of said metal;

Z = Trivalent metal capable of forming complex hydrides (e.g. B, Al, etc.)

Q = Any one of the hydrogen isotopes.

R, when defined as a hydrocarbon, is preferred to be methyl or ethyl to avoid branching or double bond formation. However, for certain applications, branched or unsaturated hydrocarbons may be highly desirable. Therefore, although not included in the general equations, the generation of branched or unsaturated hydrocarbons are part of this invention.

The following incomplete list serves to illustrate the aforesaid:

| When R = | $1_2c_1{}_{H_3}$ | $1_3c_2{}_{H_3}$ | $1_2c_1{}_{H_3}$ | $1_2c_2{}_{H_3}$ | $2_H$ | $3_H$ |
|---|---|---|---|---|---|---|
| And Q = | $1_H$ | $1_H$ | $2_H$ | $2_H$ | $2_H$ | $2_H$ |
| Then RQ = | $1_2c_1{}_{H_4}$ | $1_3c_2{}_{H_3}1_H$ | $1_2c_1{}_{H_3}2_H$ | $1_2c_2{}_{H_4}$ | $2_{H_2}$ | $2_H3_H$ etc. |

The gas generating reactions of this invention can be initiated by methods similar to those described in U.S. Pat. No. 3,734,863; temperatures in excess of 120° C are generally required to initiate the reactions. The component ingredients are generally intimately mixed in stoichiometric amounts according to the aforeidentified general equations. However, it may be desirable to employ an excess of one or more of the components. For example, one reason why one would want an excess of some of the components is to more efficiently utilize the more expensive components.

Furthermore, one or more components can be added which decompose under the reaction conditions producing similar or other gaseous products as desired. Obviously, when these decomposition reactions are endothermic, the temperature of the generated gaseous mixture will be lower than without the added components. Examples are $LiAlH_4$ which, upon thermal decompositions, generates hydrogen, and $NaN_3$ which generates nitrogen, and others.

These gas generating compositions may be encapsulated or otherwise packaged in such a manner that they may be adapted as a convenient source of predetermined quantities of gases as specified above. These compositions may be utilized as powders or they may be pressed into pellets to improve handling, storage, stability and safety characteristics as well as to achieve a more uniform rate of gas evolution after initiation. Coating of one or all of the starting components with a small amount (usually about 0.5–5 weight percent) of a suitable polymer prior to mixing has been found to further improve the handling and storage characteristics. Such coating is especially beneficial for components which are sensitive to moisture. Furthermore, micro-encapsulation techniques can be used to increase the temperature stability of certain hydride-ammonium halide combinations.

It is also part of the instant invention to optionally use binders or plasticizers to improve handling and/or mechanical stability. Any binder compatible with the rest of the composition may be used, such as polystyrene, styrene-isobutylene copolymers, or others. Similarly, any plasticizer may be used so long as it is compatible with the rest of the composition. In addition, any solvent which dissolves the binder and is compatible with the rest of the composition can be used to facilitate processing of the composition. Special precautions might be necessary in the selection of binders, plasticizers, additives and solvents when high-purity gases are desired. For example, when pure deuterium gas is desired it is beneficial to either use deuterated binders, plasticizers, additives and solvents or to use binders, plasticizers, additives and solvents which do not contain any hydrogen exchangeable under the conditions of use such as polyfluorinated compounds.

Small amounts of certain chemical compounds, or mixtures thereof, can significantly influence the gas evolution rates of the above solid mixtures. These compounds comprise a wide variety of chemical compositions. In general compounds consisting of a metal or a metal oxide radical combined with organic liqands such as the acetylacetonates, and metal oxides influence the gas generation rate when about 5% are added to the basic mixtures, as discussed in U.S. patent application Ser. No. 519,312 of Beckert et al filed on Oct. 30, 1974 incorporated herein by reference.

Small particle sizes ( $\leq 100\mu$ ) of the ingredients are desirable as large particle sizes generally decrease rate and yield. Although, in general, a small particle size of the gas generator ingredients is therefore desirable to obtain a fast and nearly complete reaction, large particle sizes might be useful for special purposes, e.g. to slow down the reaction, or to obtain a specific grain structure.

The material is conveniently prepared, in a dry box, as a slurry of the components in an inert solvent such as toluene which contains the dissolved binder and plasticizer. After evaporation of the solvent in vacuo, the material is ground in a blender and then pressed to form slugs. Depending on the nature of the material and the intended application other mixing and shaping techniques can be used, such as casting, extrusion, or inert diluent mixing.

After generation, the gases can be cooled by heat exchangers and/or heat sink arrangements containing materials having a high specific heat such as copper, nickel, or cobalt, of materials which exhibit an endothermic phase change between ambient and the desired temperature, such as low-melting materials which preferably have high heats of fusion and heat capacities (Wood's metal, Rose's metal, or chemical compounds such as $Na_2HPO_4.2H_2O$) or low-boiling liquids.

Chemical compounds which influence the gas evolution rate can be added during the mixing process or they can be added during a blending step, after evaporation of the solvent.

Additives which decompose during the reaction under gas evolution can be added directly to the basic mixture, or they can be physically separated from the basic mixture (e.g. confined in tubes embedded in the basic mixture, or by microencapsulation). This separation might be desirable in case of limited compatibility of the additives with the basic mixture.

The general nature of the invention having been set forth, the following examples are presented as specific illustration thereof and also that the invention be better understood.

EXAMPLE I

Tetramethylammonium chloride is mixed with a stoichiometric amount of lithium aluminum hydride as set forth in U.S. Pat. No. 3,734,863, and the mixture heated to start the reaction. The generated gas consists mainly of methane, with a small amount of hydrogen gas appearing as by-product.

EXAMPLE II

Deuterated ammonium chloride is mixed with a stoichiometric amount of sodium aluminum deuteride, a variable amount of lithium aluminum deuteride to cool the reaction, and 5% by weight of the total mixture of iron(III)-oxide to modify the gas evolution rate. The mixture is slurried with a solution of a suitable binder and plasticizer in an inert solvent, the solvent evaporated in vacuo, and the pulverized dry mixture pressed into slugs and fired in a suitable gas generator. The gas produced consists of more than 90% of deuterium.

Obviously numerous modifications and variations of the present invention are possible in light of the above teaching that will be recognized by one of ordinary skill in the art. It is therefore to be understood that, within the scope of the appended claims, the invention may be practiced otherwise than as specifically described.

What is claimed as new and desired to be secured by Letters Patent of the United States is:

1. A composition capable of generating a gas selected from the group consisting of gaseous hydrocarbons and hydrogen isotopes and mixtures thereof,
   said composition comprising the intimate mixture of at least one ammonium compound having the general formula $(NR^I R^{II} R^{III} R^{IV})_n X$ wherein $R^I$ to $R^{IV}$ are the same or different and are selected from the group consisting of a hydrocarbon radical and a hydrogen isotope radical, with the proviso that at least one R group is a hydrocarbon radical;
   X is an inorganic or organic acid group and $n$ is the valency of said acid group;
   and at least one hydride compound having the general formula $Y(ZQ^I Q^{II} Q^{III} Q^{IV})_m$;
   wherein Y is a mono- or divalent metal capable of forming complex hydrides and is selected from the group consisting of alkali metals and alkaline earth metals, $m$ is the valency of said mono- or divalent metal;
   Z is a trivalent metal capable of forming complex hydrides and is selected from the group consisting of boron and aluminum and
   $Q^I$ to $Q^{IV}$ are the same or different hydrogen isotopes, wherein said compounds are present in about stoichiometric amounts or are present in amounts such that there is a stoichiometric excess of one or more of the compounds.

2. The composition of claim 1 wherein said hydrogen isotope radical is selected from a group consisting of hydrogen, deuterium and tritium.

3. The composition of claim 2 wherein $R^I$ to $R^{IV}$ comprises at least one hydrocarbon radical containing at least one hydrogen isotope other than $^1H$.

4. The composition of claim 2 wherein $R^I$ to $R^{IV}$ comprises at least one hydrocarbon radical containing at least one carbon isotope other than $^{12}C$.

5. The composition of claim 2 wherein $R^I$ to $R^{IV}$ comprises at least one hydrocarbon radical containing at least one hydrogen isotope other the $^1H$ and at least one carbon isotope other than $^{12}C$.

6. The composition of claim 2 wherein $R^I$ to $R^{IV}$ comprises at least one hydrogen isotope and at least one hydrocarbon radical containing at least one hydrogen isotope other than $^1H$.

7. The composition of claim 2 wherein $R^I$ to $R^{IV}$ comprises at least one hydrogen isotope and at least one hydrocarbon radical containing at least one hydrogen isotope other than $^1H$ and at least one carbon isotope other than $^{12}C$.

8. A composition capable of generating a gas selected from the group consisting of gaseous hydrocarbons and hydrogen isotopes and mixtures thereof, said compositions comprising a mixture of $N(C^1H_3)_4Cl$ and one hydride selected from the group consisting of $LiAl^1H_4$, $NaAl^1H_4$ and $LiB^1H_4$.

9. A composition capable of generating a gas selected from the group consisting of gaseous hydrocarbons and hydrogen isotopes and mixtures thereof, said compositions comprising a mixture of $N(C^2H_3)_4Cl$ and one hydride selected from the group consisting of $LiAl^2H_4$, $NaAl^2H_4$ and $LiB^2H_4$.

10. A composition capable of generating a gas selected from the group consisting of gaseous hydrocarbons and hydrogen isotopes and mixtures thereof, said composition comprising the intimate mixture of at least one hydrazinium compound having the general formula $N_2 R^I R^{II} R^{III} R^{IV} R^V R^{VI})_n X_2$ wherein $R^I$ to $R^{VI}$ are the same or different and are selected from the group consisting of a hydrocarbon radical and a hydrogen isotope radical with the proviso that at least one R group is a hydrocarbon radical;
   X is an inorganic or organic acid group and $n$ is the valency of said acid group,
   and at least one hydride compound having the general formula $Y(ZQ^I Q^{II} Q^{III} Q^{IV})_m$
   wherein Y is a mono- or divalent metal capable of forming complex hydrides and is selected from the group consisting of alkali metals and alkaline earth metals, $m$ is the valency of said mono- or divalent metal,
   Z is a trivalent metal capable of forming complex hydrides and is selected from the group consisting of boron and aluminum and
   $Q^I$ to $Q^{IV}$ are the same or different hydrogen isotopes, wherein said compounds are present in about stoichiometric amounts or are present in amounts such that there is a stoichiometric excess of one or more of the components.

11. The composition of claim 10 wherein said hydrogen isotope radical is selected from the group consisting of hydrogen, deuterium, and tritium.

12. The composition of claim 11 wherein $R^I$ to $R^{IV}$ comprises at least one hydrocarbon radical containing at least one hydrogen isotope other than $^1H$.

13. The composition of claim 11 wherein $R^I$ to $R^{VI}$ comprises at least one hydrocarbon radical containing at least one carbon isotope other than $^{12}C$.

14. The composition of claim 11 wherein $R^I$ to $R^{VI}$ comprises at least one hydrocarbon radical containing at least one hydrogen isotope other than $^1H$ and at least one carbon isotope other than $^{12}C$.

15. The composition of claim 11 wherein $R^I$ to $R^{VI}$ comprises at least one hydrogen isotope and at least one hydrocarbon radical containing at least one hydrogen isotope other than $^1H$.

16. The composition of claim 11 wherein $R^I$ to $R^{VI}$ comprises at least one hydrogen isotope and at least one hydrocarbon radical containing at least one hydrogen isotope other than $^1H$ and at least one carbon isotope other than $^{12}C$.

17. A composition capable of generating a gas selected from the group consisting of gaseous hydrocarbons and hydrogen isotopes said composition comprising a mixture of $N_2(C^1H_3)_6Cl_2$ and $LiB^1H_4$.

18. A composition capable of generating a gas selected from the group consisting of gaseous hydrocarbon and hydrogen isotopes and mixtures thereof, said composition comprising the intimate mixture of at least one ammonium compound having the general formula $(NR'R''R'''R^{IV})_n$, X wherein $R^I$ to $R^{IV}$ are the same or different and are selected from the group consisting of a hydrocarbon radical and a hydrogen isotope radical, with the proviso that at least one R group is a hydrocarbon radical, and at least one hydrazinium compound having the general formula $(N_2R'R''R'''R^{IV}R^VR^{VI})_nX_2$ and wherein $R^I$ to $R^{VI}$ are the same or different and are selected from the group consisting of a hydrocarbon radical and a hydrogen isotope radical, with the proviso that at least one R group is a hydrocarbon radical;

X is an inorganic or organic acid group and $n$ is the valency of said acid group, and at least one hydride compound having the general formula $Y(ZQ'Q''Q'''Q^{IV})_m$ wherein Y is a mono- or divalent metal capable of forming complex hydrides and is selected from the group consisting of alkali metals and alkaline earth metals, $m$ is the valency of said mono- or divalent metal, Z is a trivalent metal capable of forming complex hydrides and is selected from the group consisting of boron and aluminum and $Q^I$ to $Q^{IV}$ are the same or different hydrogen isotopes, wherein said compounds are present in about stoichiometric amounts or are present in amounts such that there is a stoichiometric excess of one or more of the components.

19. The composition of claim 18 wherein said hydrogen isotope radical is selected from the group consisting of hydrogen, deuterium, and tritium.

20. The composition of claim 19 wherein $R^I$ to $R^{VI}$ comprises at least one hydrocarbon radical containing at least one hydrogen isotope other than $^1H$.

21. The composition of claim 19 wherein $R^I$ to $R^{VI}$ comprises at least one hydrocarbon radical containing at least one carbon isotope other than $^{12}C$.

22. The composition of claim 19 wherein $R^I$ to $R^{VI}$ comprises at least one hydrocarbon radical containing at least one hydrogen isotope other than $^1H$ and at least one carbon isotope other then $^{12}C$.

23. The composition of claim 19 wherein $R^I$ to $R^{VI}$ comprises at least one hydrogen isotope and at least one hydrocarbon radical containing at least one hydrogen isotope other than $^1H$.

24. The composition of claim 19 wherein $R^I$ to $R^{VI}$ comprises at least one hydrogen isotope and at least one hydrocarbon radical containing at least one hydrogen isotope other than $^1H$ and at least one carbon isotope other than $^{12}C$.

* * * * *